(12) United States Patent
Redfern

(10) Patent No.: US 7,011,275 B2
(45) Date of Patent: Mar. 14, 2006

(54) INTERNAL SPUR GEAR DRIVE

(76) Inventor: Daniel J. Redfern, 4740 E. Blue Jay, Orange, CA (US) 92869

( * ) Notice: Subject to any disclaimer, the term of this patent is extended or adjusted under 35 U.S.C. 154(b) by 710 days.

(21) Appl. No.: 10/212,868

(22) Filed: Aug. 7, 2002

(65) Prior Publication Data

US 2004/0077447 A1   Apr. 22, 2004

(51) Int. Cl.
   *F16H 37/00*  (2006.01)
   *B64D 35/00*  (2006.01)
(52) U.S. Cl. ................. 244/60; 244/54; 74/661; 446/58; 475/4
(58) Field of Classification Search ............... 244/54, 244/60; 475/4, 5; 74/661, 665 R, 665 A, 74/665 B; 446/33, 57, 58
   See application file for complete search history.

(56) References Cited

U.S. PATENT DOCUMENTS

| | | | |
|---|---|---|---|
| 3,832,581 A | 8/1974 | Hoffman et al. | |
| 3,940,882 A | 3/1976 | Mabuchi | |
| 3,973,448 A * | 8/1976 | Michelsen | 74/421 R |
| 4,177,693 A * | 12/1979 | Ivanko et al. | 74/661 |
| 4,198,779 A | 4/1980 | Kress | |
| 4,554,989 A | 11/1985 | Gruich et al. | |
| 4,629,438 A | 12/1986 | McAneny | |
| 5,028,828 A | 7/1991 | Felkai et al. | |
| 5,267,918 A | 12/1993 | Shiroyama | |
| 5,463,914 A * | 11/1995 | Tyan | 74/661 |
| 5,525,087 A | 6/1996 | Chin-Lin | |
| 5,735,361 A | 4/1998 | Forrest | |
| 6,022,189 A | 2/2000 | Yu | |

* cited by examiner

*Primary Examiner*—Robert P. Swiatek
(74) *Attorney, Agent, or Firm*—Richard C. Litman

(57) ABSTRACT

An internal spur gear drive has a mounting base including one or more sets of motor mounting lugs extending therefrom, for attaching a corresponding number of drive motors thereto. A drive shaft housing containing a rotary drive shaft extends from the mounting base. A drive bell is affixed to the drive shaft distal end, and rotates therewith. The opposite end of the drive bell has an internally toothed ring gear extending therefrom. Each motor drives a pinion gear which engages the internal teeth of the drive bell ring gear to rotate the drive bell and thus rotate the drive shaft as well. The motor mounting lugs are slotted, allowing the motors to be adjusted radially relative to the drive shaft and drive bell ring gear. This provides adjustment for gear lash, as well as permitting different sizes of pinion gears to be installed on the motors for different gear ratios.

18 Claims, 5 Drawing Sheets

INTERNAL SPUR GEAR DRIVE

BACKGROUND OF THE INVENTION

1. Field of the Invention

The present invention relates generally to mechanical systems for altering the rotational speed of a rotating device. More specifically, the present invention comprises a gear reduction drive having one or more internal pinion spur gears each driven by a separate motor, with each motor and pinion gear driving a larger, internally toothed ring spur gear turning at a slower RPM. The present gear reduction drive may be scaled to any practicable size and applied to any suitable machinery as desired, but is particularly well suited for reducing the output speed of relatively small electric motors used to power propeller driven model aircraft.

2. Description of the Related Art

Speed reduction drives for reducing the final output RPM of a rotary device, are well known. Typically, such devices are powered by a single prime mover (internal combustion or turbine engine, electric motor, etc.) and utilize a gear train (or belts, etc.) to reduce the rotational speed of the power source to the desired output level for the device. The conventional automobile or road vehicle is a well known example of such systems.

Aircraft, and particularly model aircraft, have particular needs in terms of powerplants and rotational speeds for propellers. It is well known that the RPM of the propeller(s) should not exceed a certain critical point, depending upon the diameter of the propeller. If this limit is exceeded, the tips of the propeller blades reach the speed of sound, which greatly lowers the efficiency of the propeller due to the energy required in producing the resulting shock or compression wave. As a result, typical aircraft reciprocating engines operate at relatively low (and inefficient) RPM, in order to avoid the weight, complexity, maintenance, and possible reliability issues which would result from a gear reduction system.

In the case of model aircraft, the need for efficiency is even more critical, due to the relatively light weights, limited internal volumes, small surface areas, and need for relatively low stall speeds for flying in limited areas and for maintaining control by remote means (radio, etc.). Most of the smaller internal combustion engines used with such model aircraft are of the two stroke cycle operating principle, as this type of engine generally has a greater power output for its weight, than is the case with other types of engines. Propeller RPM can reach critical speeds with such engines, as they operate at relatively high RPM. Nevertheless, the propeller diameters are small, which compensates for the high engine RPM, even with direct drive engines.

More recently, many model aircraft hobbyists have found it necessary to quiet the sound output of their engines at many model flying sites. When internal combustion engines are used, this results in a need for some form of muffler on the engine, which can reduce the power output of the engine to the extent that flight performance is reduced to marginal levels.

Another relatively recent trend is the development of relatively efficient electric motors, and particularly relatively efficient, high discharge rate electrical storage systems which may be adapted for use in model aircraft. Accordingly, many modelers have taken to building and flying electrically powered models as a result of the need for quieter models at many model flying sites. However, such electric motors are not without their drawbacks, as well. Generally speaking, the relatively small electric motors used do not produce equivalent amounts of torque and power in comparison to internal combustion engines (particularly two stroke cycle engines) of comparable size and weight. A modeler is required to use a relatively large and heavy motor to achieve the same power as that which may be achieved by a considerably smaller and lighter internal combustion engine. Moreover, the power density of the power storage system (i.e., electrical storage cells or batteries) for such electric motors is considerably lower than the power storage system (i.e., fuel tank) for an internal combustion engine.

In addition, many (perhaps most) such small electrical motors are operated at considerably higher RPM than is desirable, in order to produce the required torque and power output for a given application or installation. This leads to problems with propeller efficiency, as noted further above. However, the relatively high operating RPM is a necessary evil, as otherwise the motor may not produce sufficient torque to enable the model to fly. As a result, many electric motor installations are also equipped with gear reduction systems to reduce propeller RPM to more efficient levels. These speed reduction gearing systems which are known to the present inventor, tend to be less than optimally reliable and also require relatively tedious and time consuming adjustment for gear lash, gear ratio changes (if such adjustment is available at all), and other factors which occur due to normal operation and wear.

The present invention provides a solution for the above problems, in an internal spur gear drive. The present internal spur gear drive includes a motor mount having radially adjustable positioning for one or more (preferably at least two) motors. Each motor drives a pinion gear, which engages the internal teeth of a surrounding ring gear. The engagement of the pinion gears with the concave surface of the internally toothed ring gear, provides relatively greater engagement than conventional convex-to-convex spur gear engagement, thus increasing reliability. Moreover, gear ratios are easily changed using the present gear reduction system, merely by replacing the pinion gear(s) as desired and adjusting the radial position of the motor(s) correspondingly.

A discussion of the related art of which the present inventor is aware, and its differences and distinctions from the present invention, is provided below.

U.S. Pat. No. 3,832,581 issued on Aug. 27, 1974 to George R. Hoffmann et al., titled "Multi-Armature And Concentric Motors," describes several different embodiments of various types of electric motor systems. One such system comprises a series of electromagnets which alternatingly act on rotary plates to either end thereof, to cause the plates to rotate. Another embodiment comprises a series of motors each having a rotationally fixed armature, with the field or outer case rotating around the armature. A pinion gear surrounds the armature, with the motors being placed between rotating internal and external ring gears by means of rotation of the motor armature pinion gears. The Hoffmann et al. system does not provide any means of adjusting the gear ratios or gear lash of the system, nor standoffs for mounting the assembly to a firewall or other planar structure.

U.S. Pat. No. 3,940,882 issued on Mar. 2, 1976 to Kenichi Mabuchi, titled "Motor-Driven Model Airplane Having A Pusher Propeller," describes various embodiments of motor, gear reduction, propeller shaft, and other technical details of such an aircraft. While Mabuchi provides for outputs rotating either faster or slower than the motor drive, all of the gearing systems disclosed are simple dual external spur gear arrangements. No driven internal ring gear which drives a propeller, nor any means of adjusting for gear lash or firewall mounting, is disclosed by Mabuchi.

U.S. Pat. No. 4,198,779 issued on Apr. 22, 1980 to Robert W. Kress, titled "Model Aircraft Propulsion System," describes a model having multiple propeller propulsion, but having only a single engine driving all of the propellers through a belt drive system. The Kress model propulsion system thus teaches oppositely to the present system, as Kress drives multiple propellers using a single engine, whereas the present system may utilize more than one motor, but drives only a single propeller. However, it will be understood that a series of the present gear reduction drives, with their motors, may be installed in a model aircraft having multiple propellers, with one of the present gear drive and motor assemblies driving each propeller of the model. Moreover, it should be understood that the present system is not limited to use with model aircraft, but may be scaled up for other purposes as desired.

U.S. Pat. No. 4,554,989 issued on Nov. 26, 1985 to Peter Gruich et al., titled "Multimotor Modular Electric Drive Powertrain System For Turbine Powered Vehicles," describes a series of embodiments of multiple electric motor configurations, each geared to a single output shaft. One embodiment illustrates a series of motors having a single, internally toothed ring gear driven by the pinion gears of the motors. However, Gruich et al. do not disclose any means for adjusting the positions of the motors radially in the assembly to adjust for gear lash or to change pinions for different gear ratios, nor do they disclose any means of attaching the entire assembly to a firewall or other planar structure, as is provided by the present invention.

U.S. Pat. No. 4,629,438 issued on Dec. 16, 1986 to Leonard G. McAneny, titled "Rubber Band Powered Motor For Model Airplane," describes a system having a plurality of elastic bands in tension, extending laterally from a pair of longitudinal gear shafts. The bands are disposed to extend into the wing panels of the model aircraft, while the gear shafts extend along the inside of the fuselage. The bands are wrapped about spools on the gear shafts, and cause the gear shafts to rotate as tension is released in the bands. The gear shafts in turn are geared to a single propeller. McAneny provides only external spur gearing between the two gear shafts and the propeller; no internal ring gear is disclosed. Moreover, McAneny teaches away from the speed reduction of the present gearing system, due to the relatively slow motion of the extending bands in his system and the need for this slower motion to cause the propeller to rotate relatively rapidly.

U.S. Pat. No. 5,028,828 issued on Jul. 2, 1991 to Roland Felkai et al., titled "Dual Drive Mechanism With A Redundant Feature," describes a dual motor and spur gear drive to a single output shaft, with means provided for decoupling either of the motors in the event one of the motors locks up or otherwise becomes inoperative. The gearing disclosed by Felkai et al. comprises external spur and pinion gears; no driven internal ring gear is provided, as provided by the present invention. Moreover, Felkai et al. do not disclose any means of adjusting for gear lash or changing ratios by radially adjusting the position(s) of the motor(s), which feature is a part of the present invention.

U.S. Pat. No. 5,267,918 issued on Dec. 7, 1993 to Shigeru Shiroyama, titled "Ring-Shaped Internal Gear For Epicyclic Reduction Gear Type Starter Device," describes an internally toothed ring gear having a series of smaller planetary gears therein, with the planetary gears engaging both the internal teeth of the ring gear and the external teeth of a central geared shaft. The planetary gears also engage an output pinion shaft, which in turn drives the ring gear of the engine flywheel to start the engine. Shiroyama claims certain advantages for his internally toothed ring gear configuration, particularly for use in automobile engine starter motors and the like. However, the Shiroyama gear configuration requires the internally toothed ring gear to be stationary; it does not rotate, as does the ring gear of the present invention. Moreover, the revolving planetary gears of the Shiroyama assembly are not equivalent to the fixed motor driven pinion gears of the present gear train invention. Also, Shiroyama makes no provision for adjusting for gear lash nor for changing gear ratios in his gear system.

U.S. Pat. No. 5,525,087 issued on Jun. 11, 1996 to Hsu ChinLin, titled "Toy Aeroplane," describes various model airplane embodiments, with each having a pair of rubber band motors disposed side by side and torsionally driving a single propeller by means of spur gears which drive a central propeller shaft spur gear. No internally toothed ring gear is provided by Chin-Lin, nor is any means disclosed for adjusting the gearing for gear lash or changing ratios, which features are a part of the present invention.

U.S. Pat. No. 5,735,361 issued on Apr. 7, 1998 to Kenneth R. Forrest, titled "Dual-Pole Personal Towing Vehicle," describes a two wheeled device, steered by a pair of handgrip poles extending therebehind. The user is pulled along and steers by holding and manipulating the handgrip poles. The wheels are powered by motors having output shafts with spur gears thereon, which engage mating internal teeth in ring gears in the hubs of the wheels. Each wheel assembly has only one motor; there is no provision for multiple motors in the Forrest device. Moreover, Forrest does not provide any means to adjust gear lash and/or to change gear ratios, which features are a part of the present spur gear drive invention.

Finally, U.S. Pat. No. 6,022,189 issued on Feb. 8, 2000 to Jack Yu, titled "Ceiling Fan Having A Rotatable Inner Housing," describes a fan assembly with a transparent or translucent outer housing through which the lighted, rotating inner housing may be viewed. In one embodiment, a pair of axially offset spur gears transfers rotary motion between the rotating central fan shaft and an internally toothed ring gear within the inner housing. In another embodiment, a separate electric motor powers the inner housing ring gear. In neither embodiment does Yu disclose any provision for multiple, radially offset motors driving a single ring gear nor any means for adjusting lash or changing gear ratios.

None of the above inventions and patents, taken either singly or in combination, is seen to describe the instant invention as claimed. Thus an internal spur gear drive solving the aforementioned problems is desired.

SUMMARY OF THE INVENTION

The present invention comprises a spur gear drive system, having at least one (and preferably two or more) externally toothed pinion spur gears, each driven by a corresponding motor. The external pinion gear(s) engage(s) the internal teeth of a larger, surrounding, generally bell-shaped drive, which accepts power from the smaller externally toothed pinion gears. The opposite end of the bell drive is keyed or otherwise immovably secured to an output shaft, which is used to apply the rotary power as desired. The motor(s) is/are secured in place by a drive base mount, which includes a series of motor mounting lugs extending generally radially therefrom. The lugs are radially slotted, thereby permitting the motor or motors to be adjusted radially inwardly or outwardly relative to the central drive shaft. This allows adjustment for gear lash and wear, and also allows the operator to change the motor pinion gears for larger or smaller diameter gears as desired, thereby changing the gear ratio as desired.

The present internal spur gear drive invention may be adapted to virtually any operation where a relatively compact and adjustable drive is required, with the drive having provision for the power provided by multiple motors driving a single output shaft. While the present invention is particularly well suited for use as a powerplant system for electrically powered model aircraft, it may be used with other types of prime movers and scaled up as desired for other uses and applications, if so desired.

Accordingly, it is a principal object of the invention to provide an internal spur gear drive having one or more motor driven, externally toothed pinion gears driving a single internally toothed ring gear output drive.

It is another object of the invention to provide such a mechanism in which the position(s) of the motor(s) may be adjusted radially upon their mounts, thereby providing adjustment for gear lash and allowing different diameter pinion gears to be installed for different gear ratios.

It is a further object of the invention to provide such a mechanism which may include fittings for multiple motors, but which may be used with one or more of the motor fittings left open with no motor attached thereto, if so desired.

Still another object of the invention is to provide such a mechanism which is particularly well adapted for use as a powerplant frame and base for use with electrically powered model aircraft, but which may be scaled up for use in other operations and environments as well.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is an internal spur gear drive, including a mounting base which may be configured for adjustable attachment of multiple motors thereto. The motors each have a drive shaft with an externally toothed pinion spur gear extending therefrom, which engage the internal teeth of a drive bell which surrounds and protects the pinion gears. The drive bell is secured to a drive shaft which provides power output from the mechanism.

Figure 1:
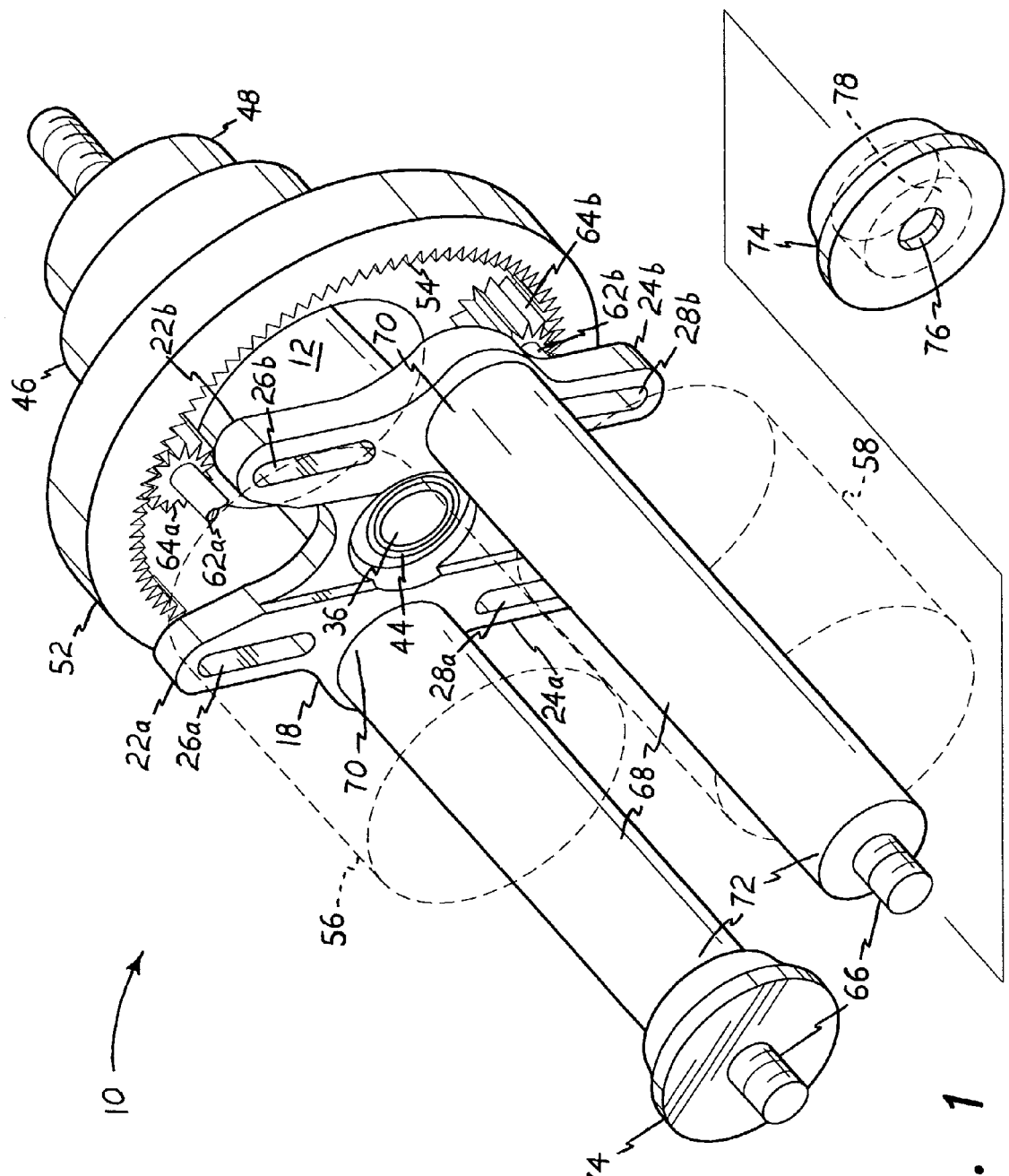
FIG. 1 is a perspective view of a first embodiment of an internal spur gear drive according to the present invention, showing various features thereof.
Figure 2:
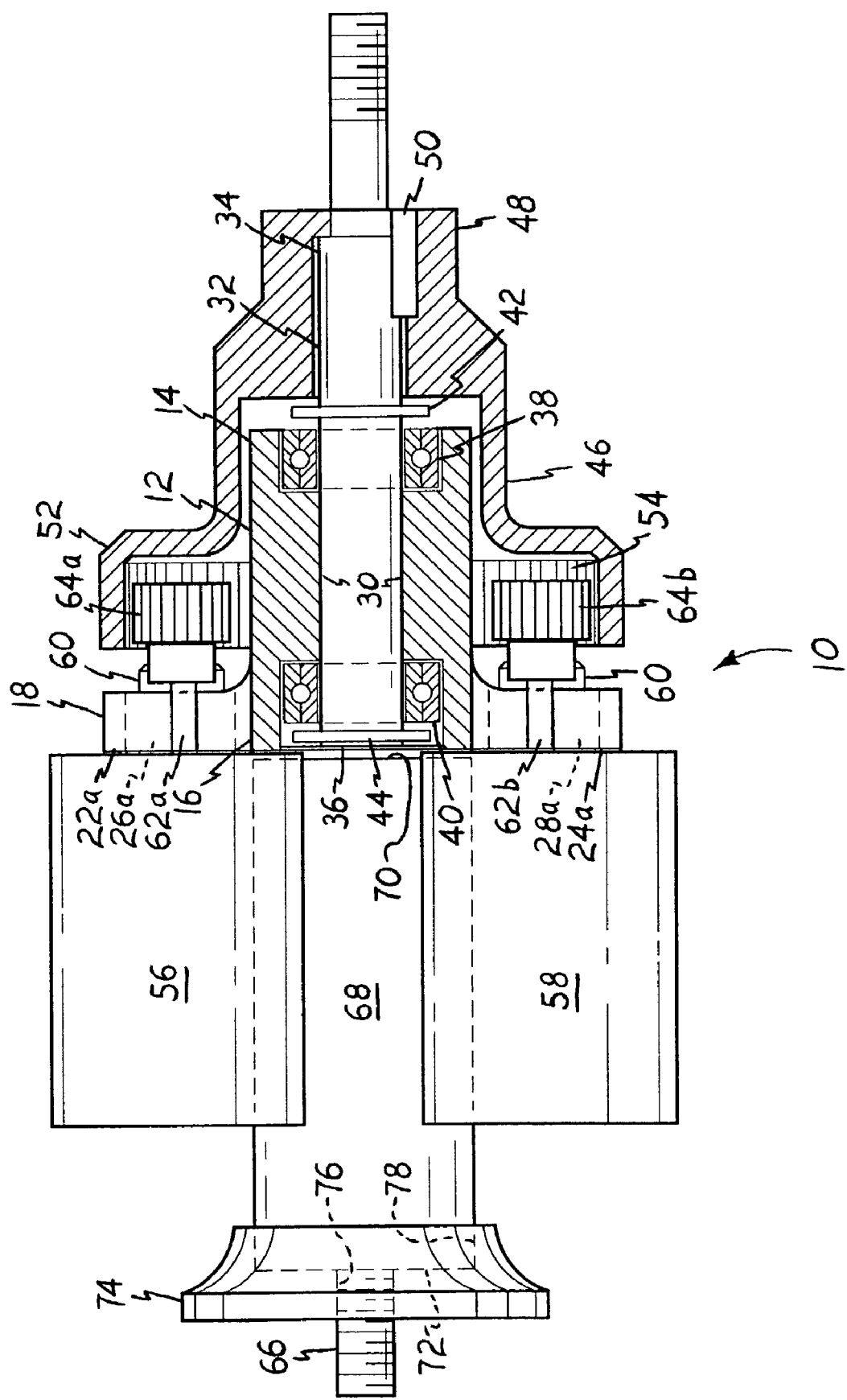
FIG. 2 is a side elevation view in section of the spur gear drive of FIG. 1, illustrating further details thereof.

FIGS. 1 and 2 of the drawings respectively provide a perspective view and a side elevation view in section of the present spur gear drive 10. The heart of the present drive system 10 comprises a drive shaft housing 12 having a distal first end 14 and an opposite second end 16 which is integrally attached to a mounting base 18. The mounting base 18 is a generally planar structure, oriented substantially normal to the axis of the drive shaft housing 12. The mounting base 18 provides for the attachment of the assembly to another structure (e.g., model aircraft firewall or bulkhead, etc.) by means of a pair of structure attachment passages 20 formed therethrough, and substantially parallel to the drive shaft housing 12. (These structure attachment passages 20 are essentially the same as those shown in the alternative embodiment mounting base structures 18a and 18b, respectively of FIGS. 3A and 3B.)

The mounting base 18 also includes two sets or pairs of motor mounting lugs extending therefrom, designated as first motor lugs 22a, 22b and second motor lugs 24a, 24b. These lugs 22a through 24b are substantially coplanar with the mounting base 18 and essentially comprise elongate arms, with corresponding lugs of each set or pair (e.g., lugs 22a and 22b) being substantially parallel to one another. Each of the lugs or arms 22a through 24b has an elongate motor position adjustment slot formed therethrough, designated as slots 26a, 26b, 28a and 28b. These slots 26a through 28b permit the positional adjustment of the drive motors radially relative to the mechanism, as described further below.

The drive shaft housing 12 includes an elongate drive shaft passage 30 formed therethrough, with an elongate drive shaft 32 installed therein; the passage 30 and drive shaft 32 are shown in FIG. 2. The drive shaft 32 has a first end 34 extending from the first end 14 of the drive shaft housing 12, and an opposite second end 36 which extends from the second end 16 of the drive shaft housing 12. The drive shaft 32 is supported within the housing 12 by first and second bearings, respectively 38 and 40, which may be pressed into relatively larger diameter bearing receptacles at each end of the drive shaft passage 30. First and second retaining clips, respectively 42 and 44, e.g., C-rings, etc., are installed in mating circumferential grooves formed adjacent the respective bearings 38 and 40, generally medially and about the second end 16 of the drive shaft 12, to secure the drive shaft 12 within the drive shaft housing 12. (Longitudinal tolerances are exaggerated in FIG. 2, for clarity in the drawing Fig.)

A rotary drive bell 46 has a first end 48 which closely fits about and is immovably affixed to the first end 34 of the drive shaft 32, and rotates with the drive shaft 32. More accurately, the drive bell 46 imparts rotary motion to the drive shaft 32 to cause the shaft 32 to rotate, as explained further below. The first end 48 of the drive bell 46 may have a keyway formed therein, with a mating keyway formed in the first end 34 of the drive shaft 32 and a key 50 installed therein to lock the two components immovably together. Other locking means, e.g., shear pins, mating non-circular shapes, splines, etc., may be used as desired.

The opposite second end 52 of the drive bell 46 has a considerably greater diameter than the first end 48 and central portion thereof. This is to allow the second end 52 to surround the gear drives of the drive motors, as explained further below. The second end 52 of the drive bell 46 has an internally toothed ring gear 54 extending therefrom, with the ring gear 54 surrounding the drive shaft housing 12 which extends from the mounting base 18 of the assembly.

Figure 3A:
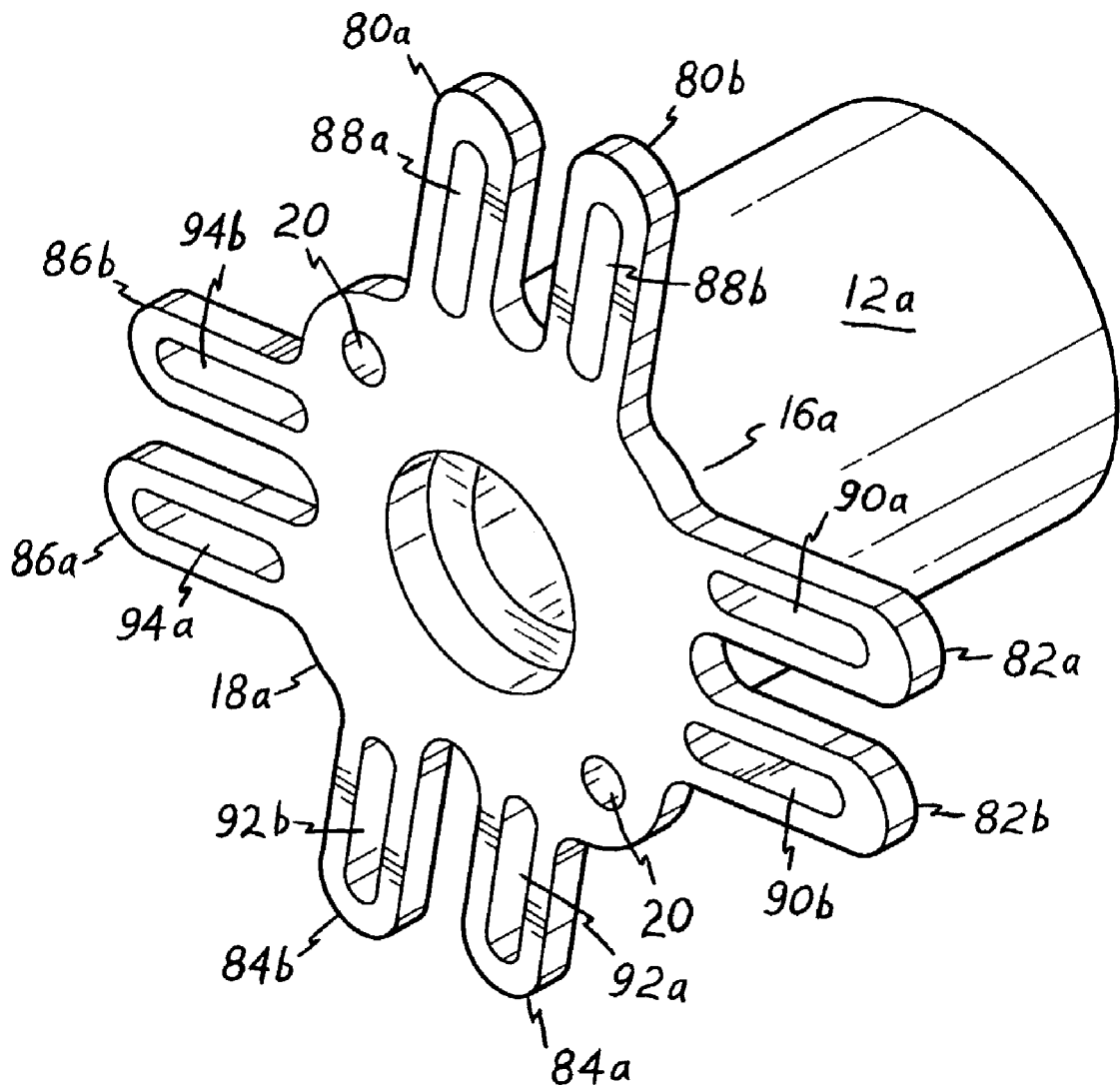
FIG. 3A is a perspective view of an alternate embodiment of the present gear drive, showing a drive base mount having provision for attaching four motors thereto.
Figure 3B:
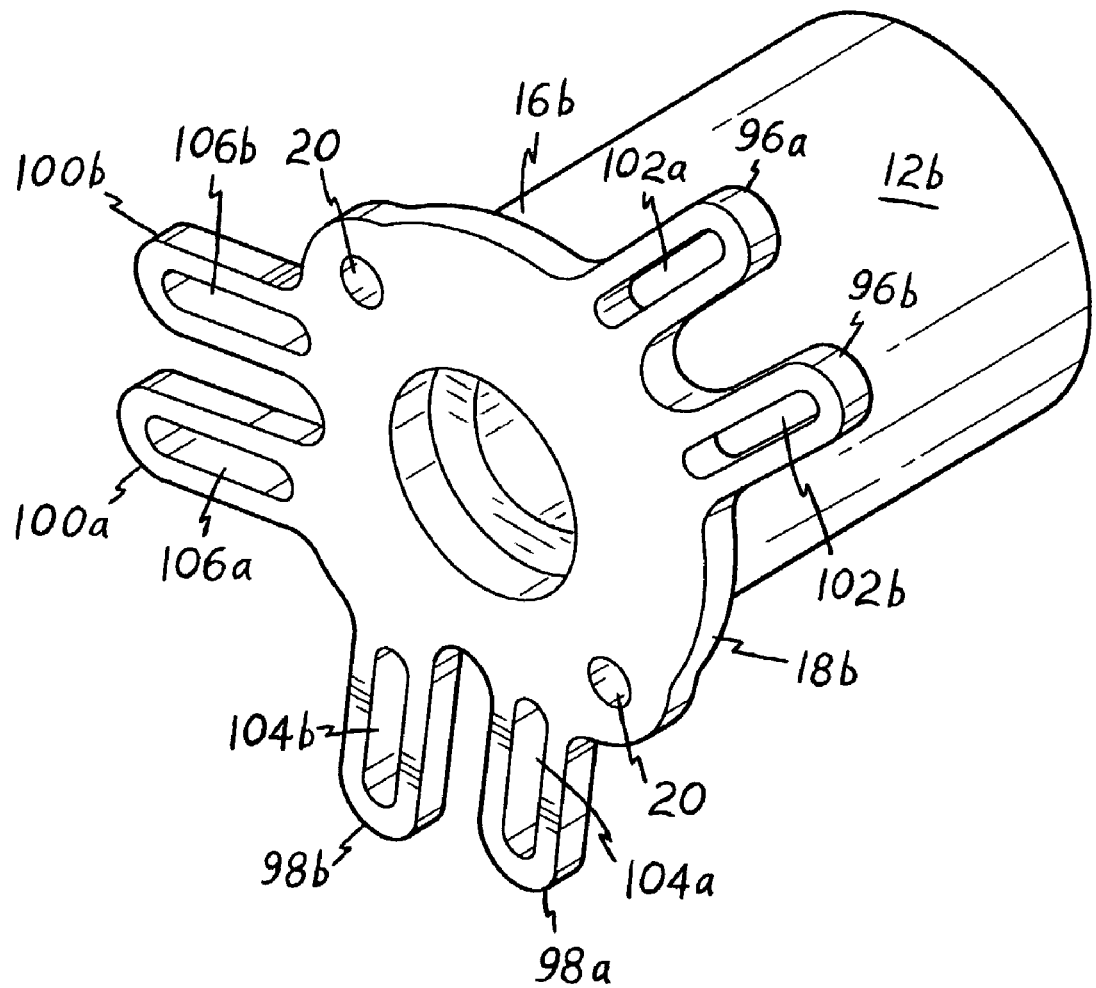
FIG. 3B is a perspective view of another alternative embodiment of the present gear drive, showing a drive base mount having provision for attaching three motors thereto.
Figure 4:
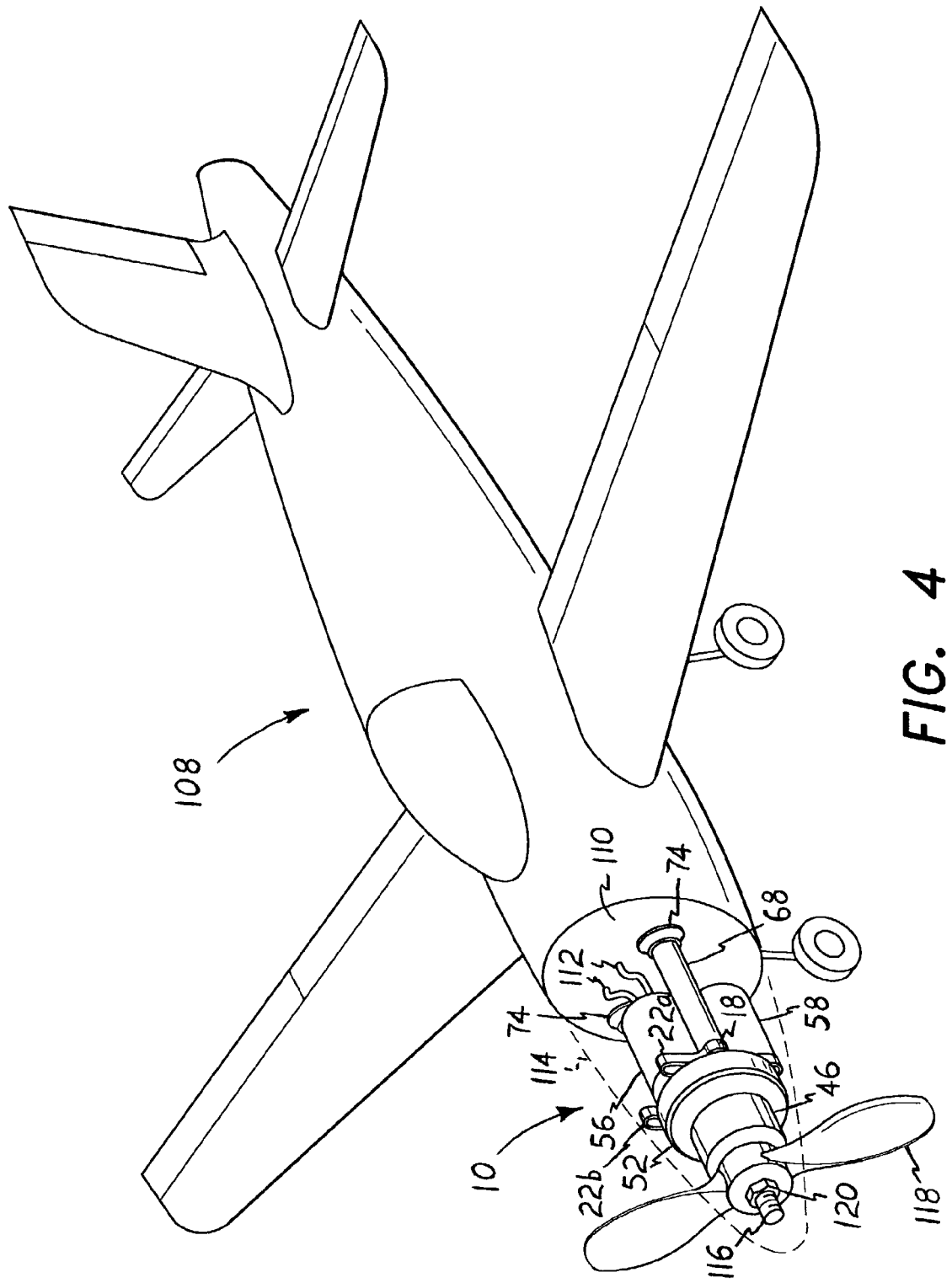
FIG. 4 is a perspective view of a model aircraft having a spur gear drive of the present invention installed thereon, showing various features thereof.

The internal spur gear drive 10 illustrated in FIGS. 1, 2, and 4 of the drawings includes two pairs of motor attachment lugs, respectively 22a, 22b and 24a, 24b, as noted further above. This provides for the installation of a first and a second motor, respectively 56 and 58, to the mounting base 18 of the assembly. Other embodiments may have provision for more motors, examples of which are illustrated in FIGS. 3A and 3B of the drawings and discussed further below. Many electric motors are conventionally provided with threaded mounting receptacles in their drive output ends. The present spur gear drive invention is configured for such motors, by means of the slotted lugs 22a through 24b. Motor mounting bolts 60 (the heads of which are visible in FIG. 2) are installed through the slotted passages 26a through 28b of the motor mounting lugs 22a through 24b, with the motors 56 and 58 being immovably but adjustably affixed to the mounting base 18 opposite to the drive shaft housing 12. While two such motors 56 and 58 are illustrated in FIGS. 1, 2, and 4, it will be seen that one lug pair may be left open, and only one motor installed, if so desired.

Each of the motors 56 and 58 has an output or drive shaft, respectively 62a and 62b, extending therefrom, with each output shaft 62a and 62b having an externally toothed spur or pinion gear, respectively 64a and 64b, secured to the distal end thereof. The motors 56 and 58 are positionally adjusted radially along their respective mounting lugs 22a through 24b, to position their respective pinion gears 64a and 64b in meshing contact with the internal teeth of the ring gear 54, with a minimum of gear lash.

The radial adjustment of the motors 56 and 58 along their respective mounting arms or lugs 22a through 24b, also allows the operator of the present device to easily and readily change pinion gears 64a and 64b as desired. The drive bell 46 is easily removed from the first end 34 of the drive shaft 32, to access the pinion gears 64a and 64b of the motors 56 and 58. The gears 64a and 64b may then be removed from their respective drive shafts 62a and 62b for interchange thereof, as desired. When higher RPM but lower torque is desired, larger pinion gears may be installed on the motors 56 and 58, resulting in a drive shaft 32 rotational speed more closely approximating that of the motors 56 and 58. If greater torque but relatively lower RPM is desired, e.g., for turning a relatively large diameter propeller, smaller pinion gears may be installed, allowing the two motors 56 and 58 to turn faster but resulting in a relatively low rotational speed for the drive shaft 32. It will be seen that rotational speed and power output are also related to the type(s) of motors used and their electrical connection, i.e., series, parallel, or series/parallel, as desired.

The present internal spur gear drive 10 is attached to a support structure (e.g., firewall or bulkhead of a model aircraft, for relatively small scale embodiments) by a pair of elongate mounting bolts 66, which extend through the structural attachment passages 20 of the mounting base 18 and pass essentially alongside and parallel to the two motors 56 and 58, generally opposite the drive shaft housing 12. (The distal, threaded attachment ends of the bolts 66 are visible in FIGS. 1 and 2.)

Each of the bolts 66 includes an elongate, tubular spacer or standoff 68 removably installed thereon. Each of the standoffs 68 has a first end 70 adjacent the mounting base 18, and an opposites second end 72 which is positioned near the attachment structure when the present assembly 10 is secured thereto. The standoffs 68 act as compression members or stops between the mounting base 18 and structure to which the bolts 66 are secured, to maintain the proper distance between the mounting base 18 and the attachment structure for the motors 56 and 58, associated wiring, etc.

A standoff pad 74 is provided at the second end 72 of each of the standoffs 68. Each pad 74 includes a bolt passage 76 formed therethrough, for passing over the threaded engaging ends of the two mounting bolts 66 shown in FIGS. 1 and 2, and a socket 78 which fits around the relatively smaller diameter of the second end 72 of each of the standoffs 68. These pads 74 have a relatively wider diameter than that of the standoffs 68, and serve to distribute the compressive loads of the standoffs 68 over a wider area of the structure to which the present gear drive 10 is bolted.

To this point, emphasis has been placed upon the embodiment illustrated in detail in FIGS. 1 and 2 of the drawings, showing two motors 56 and 58 installed side by side and driving two pinion spur gears 64a and 64b. However, other configurations of the present spur gear drive may be provided, as desired. FIGS. 3A and 3B illustrate two alternative embodiments of the central component of the present invention, having provision for larger numbers of motors installed thereto for greater power output.

In FIG. 3A, the drive shaft housing 12a has a mounting base 18a extending from the second end 16a thereof, with the mounting base 18a having a series of four pairs of motor mounting lugs extending generally radially therefrom, designated as mounting lugs 80a and 80b, 82a and 82b, 84a and 84b, and 86a, 86b. These four motor mounting lug pairs 80a through 86b each include a motor mounting bolt slot formed therethrough, respectively designated as slots 88a, 88b, 90a, 90b, 92a, 92b, 94a and 94b. The lugs and slots of each pair are parallel to one another. The four lug pairs 80a through 86b and their corresponding slots 88a through 94b provide for the attachment of up to four separate motors to the mounting base 18a, with the motors driving four separate pinion gears engaged with the internal teeth of the drive bell. The motors used with the mounting plate 18a of FIG. 3A may be of the same type illustrated in FIGS. 1, 2, and 4, with the only difference being their number and wiring harness. The drive bell, drive shaft, and other components used with the mounting plate 18a of FIG. 3A, are identical to those components illustrated in FIGS. 1 and 2.

FIG. 3B illustrates yet another embodiment of the present invention, comprising a drive shaft housing 12b having a mounting plate 18b extending from the second end 16b thereof. The embodiment of FIG. 3B differs from other embodiments in that it has three sets of motor mounting lug pairs, designated as lugs 96a and 96b, 98a and 98b, and 100a, 100b. Corresponding slots 102a, 102b, 104a, 104b, 106a and 106b are formed through each of the lugs 96a through 100b. The three lug pairs 96a through 100b of the embodiment of FIG. 3B, permit the installation of three separate motors driving three separate pinion gears which engage the internal teeth of the bell drive installed thereto. The remaining components of the assembly used with the embodiment of FIG. 3B are identical to those illustrated in FIGS. 1 and 2 and discussed in detail further above. Also, while the spacing between each of the lug pairs of the FIG. 3B embodiment is not uniform, it will be seen that even or uneven spacing of lug pairs, as desired, is acceptable in the present mechanism.

The present gear drive mechanism in any of its embodiments may be scaled upwardly or downwardly to provide a multiple motor drive for any of a number of different applications and devices. While emphasis has been placed upon the use of electric motors with the present gear drive system, it will be seen that other types of motors or engines, e.g., reciprocating internal combustion engines, hydraulic motors, etc., may be applied to the present gear drive mechanism as desired, with the first end of the drive shaft being configured as required for the application or use.

However, the present mechanism is particularly well suited for securing a series of relatively small electric motors to drive a single output drive for a model aircraft or the like, as shown in FIG. 4 of the drawings. In FIG. 4, the airframe 108 (i.e., the portion of the aircraft less the engine or powerplant) of a powered model airplane is equipped with the present internal spur gear drive 10, in accordance with the first embodiment thereof illustrated in detail in FIGS. 1 and 2 of the drawings. The assembly 10 is secured to the firewall 110 of the model aircraft structure 108, and extends forwardly therefrom, separated from the firewall 110 by the two standoffs 68 and pads 74. Conventional electrical storage cells or batteries (not shown) may be carried in the fuselage of the model aircraft structure 108, and supply the two motors 56 and 58 with electrical power by suitable wiring 112. A cowling 114, shown in broken lines, may be installed around the assembly 10 for streamlining and appearance, as desired.

The first end of the propeller drive shaft includes a threaded extension 116 extending therefrom, upon which a model aircraft propeller 118 is installed. A conventional internally threaded nut 120 is secured to the threaded propeller drive shaft extension 116 to secure the propeller 118 in place. The spur gear drive 10 of FIGS. 1, 2, and 4, when installed on a model aircraft airframe such as the model aircraft airframe 108 of FIG. 4, provides the model hobbyist with a wide range of options for installing one or more drive motors, as well as further options in gearing the motors for optimum torque or rotational speed as desired.

In conclusion, the present internal spur gear drive in its various embodiments provides a convenient means for providing power output to a single drive or output shaft, from two or more motors or other power sources. Where electric motors are used, the motors: may be wired in series, series/parallel, or parallel array, to provide greater duration or greater power output from an electrical storage cell or battery, as desired. The versatility of the present gear drive enables a user thereof to install only a single motor, if so desired, or to install a number of motors up to the corresponding number of motor mount lug pairs provided, depending upon the specific embodiment of the present invention.

The internally toothed drive bell, with its relatively large diameter internally toothed ring gear, serves to protect the externally toothed spur gears driven by the motor(s), as well as other components, from debris and foreign matter, thus prolonging their lives and increasing reliability. Also, the use of an internally toothed ring gear for receiving power from the motor drive gears, provides relatively greater tooth contact between drive and driven gears than is achieved with mating externally toothed gears, thus further increasing reliability of the system. Thus, the present internal spur gear drive invention will find great favor among those who require a compact and versatile power package for any of a variety of different installations.

It is to be understood that the present invention is not limited to the embodiments described above, but encompasses any and all embodiments within the scope of the following claims.

I claim:

1. An internal spur gear drive, comprising:
   an elongate drive shaft housing having a first end and a second end opposite said first end;
   a generally planar mounting base extending from the second end of said drive shaft housing, formed integrally therewith and substantially normal thereto;
   at least one set of motor mounting lugs extending from said mounting base, substantially coplanar with said mounting base;
   said mounting base having at least a pair of structure attachment passages formed therethrough, disposed substantially parallel to said drive shaft housing;
   a rotary drive shaft having a first end and a second end opposite the first end, the drive shaft being rotatably mounted within said drive shaft housing with the first end of said drive shaft extending from the first end of said drive shaft housing;
   a rotary drive bell having a first end and a second end opposite the first end, the first end of said drive bell being immovably affixed to the first end of said drive shaft in order to rotate with said drive shaft;
   an internally toothed ring gear extending from the second end of said drive bell, and circumferentially surrounding said drive shaft housing of said mounting base;
   at least one motor immovably affixed to said at least one set of motor mounting lugs of said mounting base, and extending substantially opposite said drive shaft housing;
   a motor drive shaft extending from said at least one motor, substantially parallel to said drive shaft housing; and
   an externally toothed pinion gear disposed upon said motor drive shaft, and rotationally engaging said internally toothed ring gear of said drive bell for driving said drive bell.

2. The internal spur gear drive according to claim 1, wherein:
   said at least one set of motor mounting lugs comprises a pair of elongate, parallel arms, each of said arms having an elongate motor position adjusting slot formed therethrough;
   whereby said at least one motor is radially adjustable positionally relative to said drive shaft housing and said internally toothed ring gear of said drive bell for adjusting gear lash and changing gear ratios as desired.

3. The internal spur gear drive according to claim 1, wherein said at least one set of motor mounting lugs comprises a plurality of sets selected from the group consisting of two, three, and four sets of motor mounting lugs; and
   said at least one motor comprises a separate motor adjustably secured to each of the sets of lugs.

4. The internal spur gear drive according to claim 1, further including:
   an elongate mounting bolt removably disposed through each of said structure attachment passages of said mounting base, and extending generally opposite said drive shaft housing;
   an elongate, tubular standoff removably disposed over each said mounting bolt;
   each said standoff having a first end adjacent said mounting base, and a second end opposite said first end; and
   a standoff pad removably disposed over each said mounting bolt, adjacent the second end of each said standoff.

5. The internal spur gear drive according to claim 1, further including:
- a first bearing installed within the first end of said drive shaft housing and generally medially about said drive shaft;
- a second bearing installed within the second end of said drive shaft housing and about the second end of said drive shaft;
- a first retaining clip secured about said drive shaft, adjacent said first bearing; and
- a second retaining clip secured about said drive shaft, adjacent said second bearing.

6. The internal spur gear drive according to claim 1, further including means for immovably securing said drive bell to said drive shaft.

7. A model aircraft powerplant assembly, comprising:
- an elongate propeller drive shaft housing having a first end and a second end opposite the first end;
- a generally planar mounting base extending from the second end of said propeller drive shaft housing, formed integrally therewith and substantially normal thereto;
- at least one set of motor mounting lugs extending from said mounting base, substantially coplanar with said mounting base;
- said mounting base having at least a pair of structure attachment passages formed therethrough, disposed substantially parallel to said propeller drive shaft housing;
- a rotary propeller drive shaft having a first end and a second end opposite the first end, the drive shaft being rotatably mounted within said propeller drive shaft housing with the first end of said drive shaft extending from the first end of said propeller drive shaft housing;
- a propeller secured to the first end of said propeller drive shaft;
- a rotary drive bell having a first end and a second end opposite said first end, with the first end of said drive bell immovably affixed to the first end of said propeller drive shaft in order to rotate with said drive shaft;
- an internally toothed ring gear extending from the second end of said drive bell, and circumferentially surrounding said propeller drive shaft housing of said mounting base;
- at least one motor immovably affixed to said at least one set of motor mounting lugs of said mounting base, and extending substantially opposite said propeller drive shaft housing;
- a motor drive shaft extending from said at least one motor, substantially parallel to said propeller drive shaft housing; and
- an externally toothed pinion gear disposed upon said motor drive shaft, and rotationally engaging said internally toothed ring gear of said drive bell for driving said drive bell.

8. The model aircraft powerplant assembly according to claim 7, wherein:
- said at least one set of motor mounting lugs comprises a pair of elongate, parallel arms; and
- each of said arms further includes an elongate motor position adjusting slot formed therethrough, whereby said at least one motor is radially adjustable positionally relative to said drive shaft housing and said internally toothed ring gear of said drive bell for adjusting gear lash and changing gear ratios as desired.

9. The model aircraft powerplant assembly according to claim 7, wherein said at least one set of motor mounting lugs comprises a plurality of sets selected from the group consisting of two, three, and four sets of motor mounting lugs; and said at least one motor comprises a separate motor adjustably secured to each of the sets of lugs.

10. The model aircraft powerplant assembly according to claim 7, further including:
- an elongate mounting bolt removably disposed through each of said structure attachment passages of said mounting base, and extending generally opposite said drive shaft housing;
- an elongate, tubular standoff removably disposed over each said mounting bolt;
- each said standoff having a first end adjacent said mounting base, and a second end opposite said first end; and
- a standoff pad removably disposed over each said mounting bolt, adjacent the second end of each said standoff.

11. The model aircraft powerplant assembly according to claim 7, further including:
- a first bearing installed within the first end of said drive shaft housing and generally medially about said drive shaft;
- a second bearing installed within the second end of said drive shaft housing and about said second end of said drive shaft;
- a first retaining clip secured about said drive shaft, adjacent said first bearing; and
- a second retaining clip secured about said drive shaft, adjacent said second bearing.

12. The model aircraft powerplant assembly according to claim 7, further including means for immovably securing said drive bell to said drive shaft.

13. A model aircraft and model aircraft powerplant assembly, comprising in combination:
- a powered model aircraft airframe structure;
- a model aircraft powerplant mounting assembly attached to said airframe structure and having an elongate propeller drive shaft housing with a first end and a second end opposite the first end;
- a generally planar mounting base extending from the second end of said propeller drive shaft housing, formed integrally therewith and substantially normal thereto;
- at least one set of motor mounting lugs extending from said mounting base, substantially coplanar with said mounting base;
- said mounting base having at least a pair of structure attachment passages formed therethrough, disposed substantially parallel to said propeller drive shaft housing;
- a rotary propeller drive shaft having a first end and a second end opposite the first end, the drive shaft within said propeller drive shaft housing with the first end of said drive shaft extending from the first end of said propeller drive shaft housing;
- a propeller secured to the first end of said propeller drive shaft;
- a rotary drive bell having a first end and a second end opposite the first end, the first end of said drive bell being immovably affixed to said first end of said propeller drive shaft in order to rotate with said drive shaft;
- an internally toothed ring gear extending from the second end of said drive bell, and circumferentially surrounding said propeller drive shaft housing of said mounting base;
- at least one motor immovably affixed to said at least one set of motor mounting lugs of said mounting base, and extending substantially opposite said propeller drive shaft housing;
- a motor drive shaft extending from said at least one motor, substantially parallel to said propeller drive shaft housing; and an externally toothed pinion gear disposed upon said motor drive shaft, and rotationally engaging said internally toothed ring gear of said drive bell for driving said drive bell.

14. The model aircraft and model aircraft powerplant assembly combination according to claim 13, wherein:

said at least one set of motor mounting lugs comprises a pair of elongate, parallel arms; and each of said arms has an elongate motor position adjusting slot formed therethrough, whereby said at least one motor is radially adjustable positionally relative to said drive shaft housing and said internally toothed ring gear of said drive bell for adjusting gear lash and changing gear ratios as desired.

15. The model aircraft and model aircraft powerplant assembly combination according to claim 13, wherein said at least one set of motor mounting lugs comprises a plurality of sets selected from the group consisting of two, three, and four sets of motor mounting lugs; and said at least one motor comprises a separate motor adjustably secured to each of the sets of lugs.

16. The model aircraft and model aircraft powerplant assembly combination according to claim 13, further including:

an elongate mounting bolt removably disposed through each of said structure attachment passages of said mounting base, and extending generally opposite said drive shaft housing;

an elongate, tubular standoff removably disposed over each said mounting bolt;

each said standoff having a first end adjacent said mounting base, and a second end opposite said first end; and a standoff pad removably disposed over each said mounting bolt, adjacent the second end of each said standoff.

17. The model aircraft and model aircraft powerplant assembly combination according to claim 13, further including:

a first bearing installed within said first end of said drive shaft housing and generally medially about said drive shaft;

a second bearing installed within said second end of said drive shaft housing and about said second end of said drive shaft;

a first retaining clip secured about said drive shaft, adjacent said first bearing; and a second retaining clip secured about said drive shaft, adjacent said second bearing.

18. The model aircraft and model aircraft powerplant assembly combination according to claim 13, further including means for immovably securing said drive bell to said drive shaft.

* * * * *